INVENTOR
EDGARDO A. CRUZ

May 13, 1969  E. A. CRUZ  3,443,439
AUTOMATIC SAMPLER
Filed Dec. 5, 1967  Sheet 3 of 3
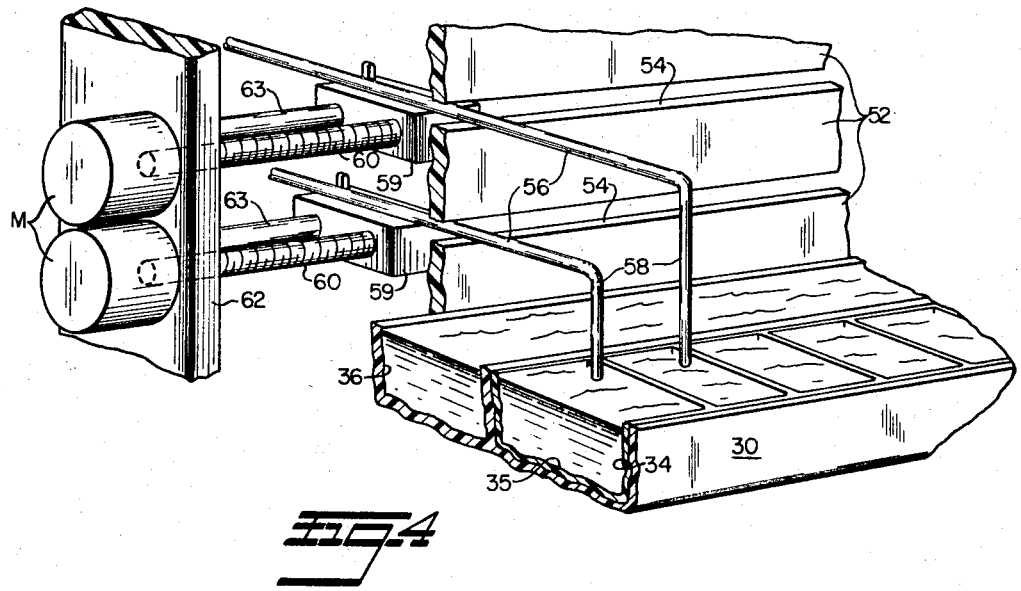
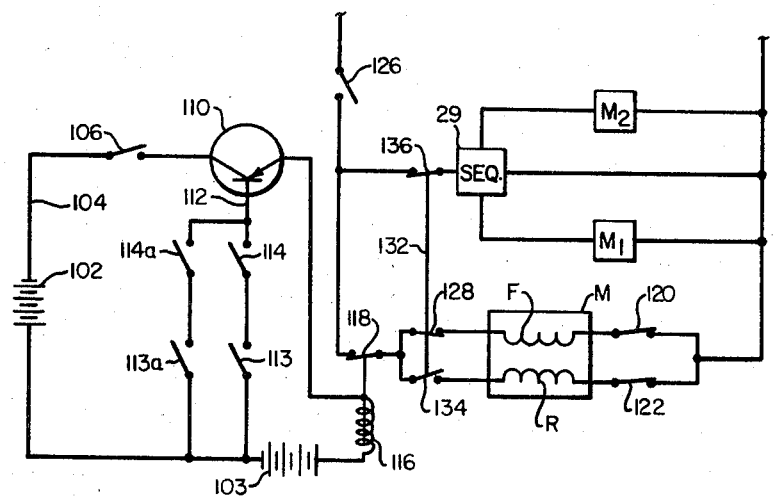
INVENTOR
EDGARDO A. CRUZ
BY *Strauch, Nolan, Neale, Nies & Kurz*
ATTORNEYS United States Patent Office 3,443,439
Patented May 13, 1969

3,443,439
AUTOMATIC SAMPLER
Edgardo A. Cruz, 10307 Douglas Ave.,
Silver Spring, Md. 20902
Filed Dec. 5, 1967, Ser. No. 688,196
Int. Cl. G01n 1/10
U.S. Cl. 73—423
7 Claims

ABSTRACT OF THE DISCLOSURE

An automatic sampling apparatus for large numbers of fluid specimens permitting the selective withdrawal of a plurality of samples from a single specimen to be subjected to a plurality of different tests or the simultaneous withdrawal of a sample from a plurality of specimens, each of which is to be subjected to a different test. A plurality of sampling devices are mounted for transverse movement with respect to a specimen support and to each other. The specimen support is movable relative to the sampling device to and from a sampling position.

Background of the invention

This invention relates generally to fluid sampling devices associated with chemical analyzers, and more particularly to a system for sampling automatically a large number of liquid specimens to be analyzed for various purposes.

While the invention is of general application it will be described herein as applied to the sampling of blood, serum or other biological fluids for analysis in accordance with standard clinical procedures.

The problems associated with the sampling of a large number of fluid specimens are known to those skilled in the art. Attempts to perform such tests manually have not been satisfactory for several reasons. First, a great deal of time is required to complete the many sampling operations. Second, the results are often inaccurate, especially on those specimens sampled last when, apparently, the operator has become tired or negligent. Third, as a result of the time and inaccuracy involved, the cost has been high. Thus, it is evident that replacement of manual sampling technique is desirable.

Attempts have been made to automate the sampling of large numbers of specimens. One approach has been to align a number of specimens in a tray and selectively withdraw a sample from a specimen by means of a single movably mounted pipette. The sample withdrawn is then automatically subjected to a plurality of tests. Several disadvantages are present in this system. First, only a single specimen may be analyzed at one time. Thus, although it may be more accurate than a manual analysis, it does not substantially reduce the amount of time required to analyze all the specimens. Second, the withdrawn sample is subjected to a plurality of tests, whether or not all such tests are desired or required. As the total cost of the chemical analysis is dependent on the number of separate tests performed on the specimen, this system may be unnecessarily costly to a person desiring the performance of only a particular test or tests, and not all of them.

Summary of the invention

An object of this invention is to provide apparatus for sampling efficiently and automatically a large number of fluid specimens.

Another object of this invention is to provide a system capable of subjecting automatically a fluid specimen to either a single or plural number of tests, as desired.

Another object of this invention is to provide a system which enables an operator either to withdraw simultaneously a plurality of samples from a single specimen or to sample simultaneously a plurality of specimens to be analyzed for different purposes.

This invention overcomes the disadvantages of the prior art and accomplishes the above objects by providing a support assembly for a number of fluid specimen containers which is effective to move each container to and from a fluid sampling position. A plurality of sampling devices, which may be dippers or pipettes, corresponding in number to the maximum number of tests or analyses to be performed, are mounted for traversing movement with respect to the specimen containers and to each other to permit selective withdrawal of a sample of a particular specimen. A panel control board has a plurality of vertical rows of selector means corresponding in number to the maximum number of specimen containers which the device can accommodate and a plurality of horizontal rows of selector means corresponding to the number of traversing sampling devices, and, thus, to the maximum number of tests to be performed. Hence, a desired test or any desired number of tests may be performed on a particular specimen merely by depressing the appropriate selector means to move the appropriate pipette or pipettes to the preselected position over the specimen to be sampled. Control means is provided to accomplish automatically the traversing movement of the pipettes to and from the preselected position and the movement of the specimens to and from a sampling position.

Provision is also made for washing the pipettes after each sampling operation.

Description of the drawings

The invention will be best understood as described in conjunction with the accompanying drawings, in which:

FIGURE 4 is an enlarged fragmentary perspective view, partially in section, of a suitable mechanism for supporting and selectively positioning the pipettes; and FIGURE 5 illustrates a control circuit to provide for fully automatic operation of the sampling structure.

Description of preferred embodiment

Figure 1:
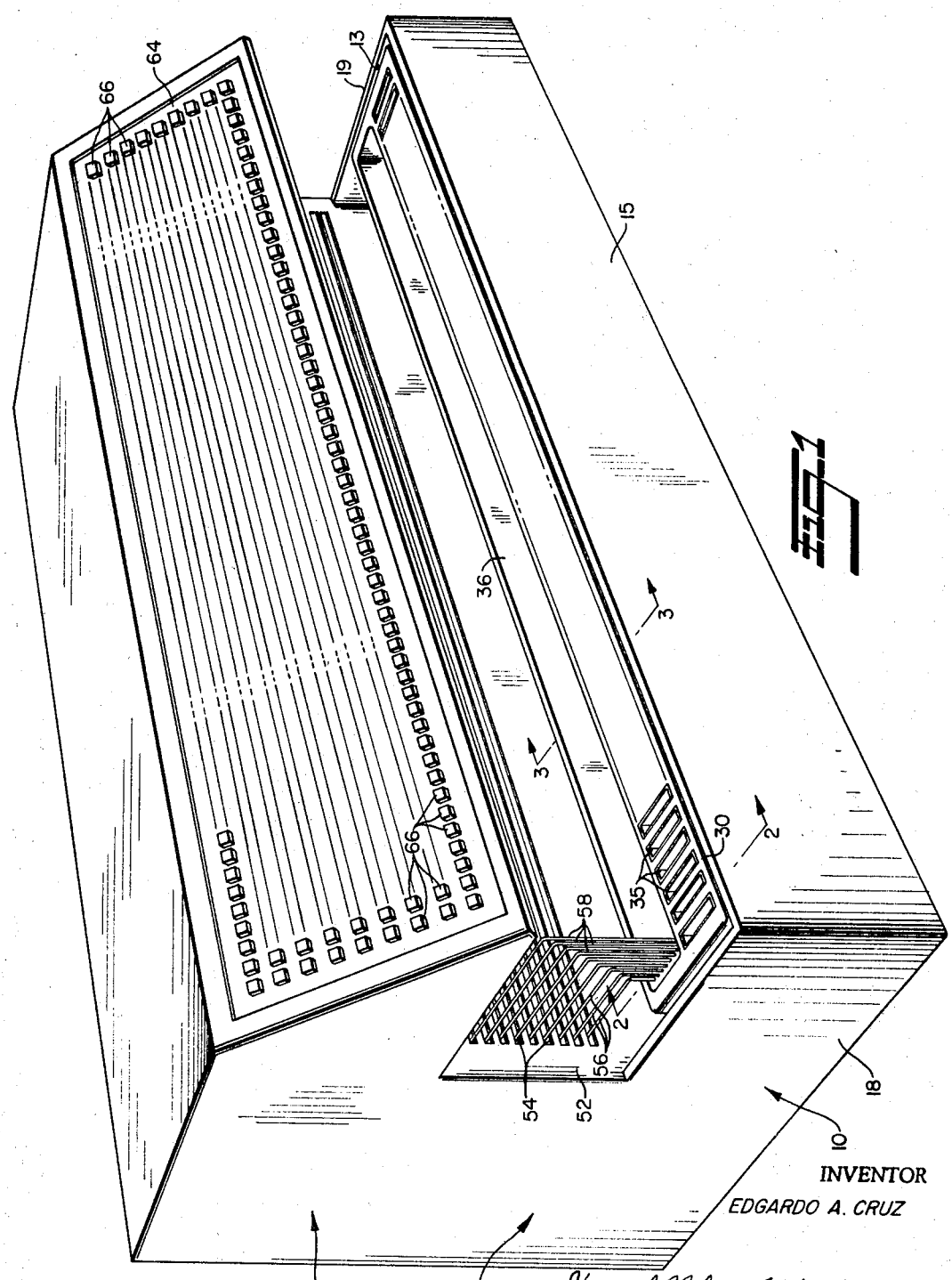
FIGURE 1 is a perspective view of an illustrative embodiment of the system of my invention.

Referring now to the drawing, and more particularly to FIGURE 1, the components of the invention are housed in a compact, attractive housing which comprises a base portion 10, intermediate portion 11, and top portion 12.

Figure 2:
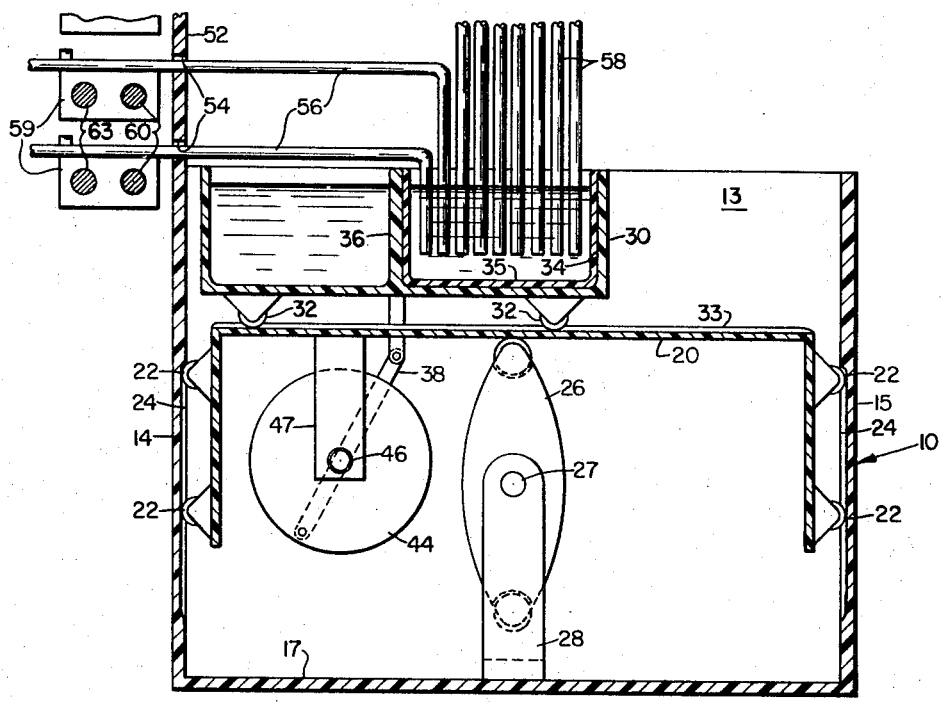
FIGURE 2 is a vertical section taken along 2—2 of FIGURE 1 illustrating a mechanism for moving the specimen support vertically in the housing.
Figure 3:
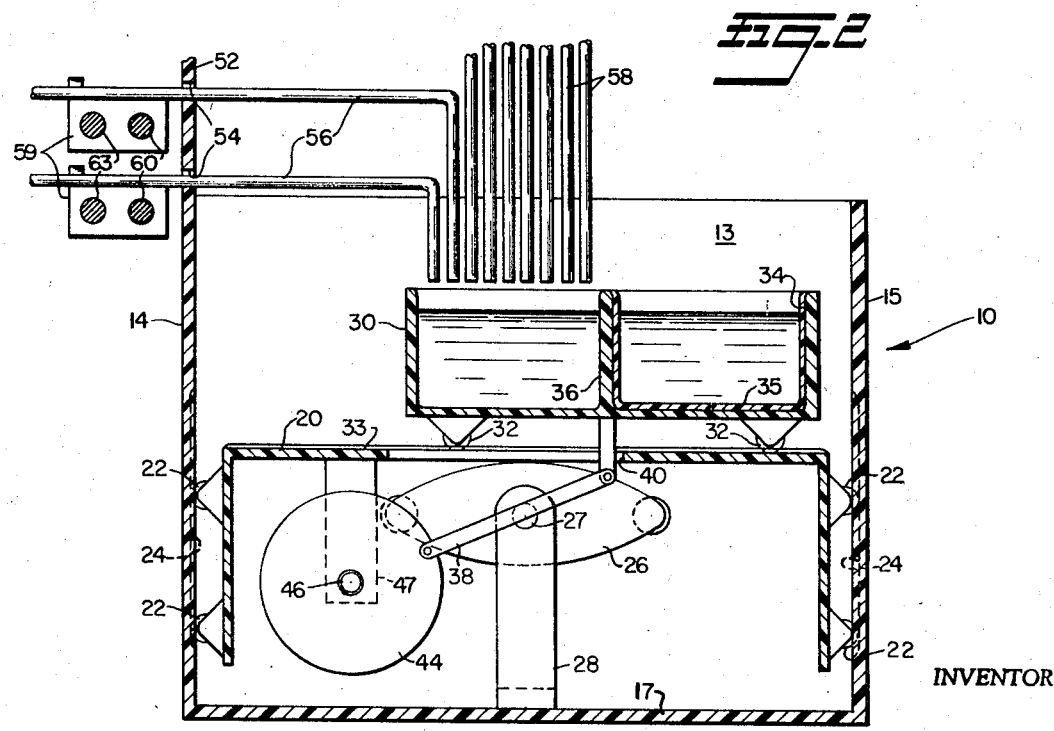
FIGURE 3 is a vertical section along line 3—3 of FIGURE 1 illustrating a mechanism for moving the specimens horizontally between washing and sampling stations.

As best shown in FIGURES 2 and 3 housing base portion has an upwardly open recess 13 formed by side walls 14 and 15, bottom wall 17 and end walls 18 and 19. Received within the recess 13 is a table support 20 mounted for vertical movement by rollers 22 which travel along opposed vertical tracks 24 formed in the recess side walls 14 and 15.

The vertical position of the table 20 is controlled by one or more cams 26 carried by a shaft 27 supported at its opposite ends on posts 28. Shaft 27 is driven by table motor $M_1$ and sequencer 29 (see FIGURE 5). In FIGURE 2 cams 26 are shown supporting table 20 in its raised position which is the sampling position. The rest position of the table 20 is shown in FIGURE 3.

With continued reference to FIGURE 2 a tray 30 is movably mounted on the upper surface of table 20 by rollers 32 which travel along tracks 33 formed in the upper surface of the table. The tray 30 is formed with a plurality of front recesses 34 in which the containers 35 for the specimens to be sampled are placed and a rearward trough 36 which contains a washing fluid such as water.

Illustrated in FIGURE 3 is a drive mechanism for moving the tray horizontally on table 20. This drive mechanism comprises one or more connecting rods 38 extending through openings 40 in table 20 for connection to a flywheel 44. The flywheel is carried by shaft 46 supported on posts 47 and driven by motor $M_2$ (FIGURE 5) controlled by sequencer 29. The entire drive mechanism including the motor $M_2$ and sequencer are carried by the table 20.

The specific drive mechanisms described for accomplishing the relative motion of the table 20 and tray 30 are for illustrative purposes only, and it is to be understood that any suitable drive system may be used.

Referring to FIGURES 1 and 2, upward extension 52 of the base inner wall 14 has a plurality of longitudinally extending slots 54 through which pipettes or sippers 56 extend. The number of slots 54 and pipettes 56 provided in the apparatus may be varied, and corresponds to the maximum number of separate tests or analyses to be performed on the specimens. The particular embodiment illustrated contemplates the use of nine pipettes for nine separate tests. Each of the pipettes is connected to conventional analyzing equipment (not shown) capable of performing the desired test or analysis. For example, the analyzer may be of the type shown in U.S. Patent 2,797,149.

As shown in FIGURE 4, pipettes 56 extend outwardly through slots 54 and are bent to form downwardly extending legs 58 which are selectively inserted into the specimen containers 35 to remove a sample therefrom. As shown, each upwardly successive pipette extends outwardly a greater distance than the next subjacent one sufficient to permit relative horizontal movement of each pipette with respect to the others. Pipettes 56 are also spaced and arranged in a manner permitting simultaneous insertion of all legs 58 into a single specimen container. The pipettes are supported by blocks 59, which are positively horizontally positioned by screws 60 suitably supported by columns 62 and driven by conventional reversible motors M. Blocks 59 slide freely along fixed guide rods 63 which prevent rotation of the blocks when the drive screws 60 are rotated.

Referring again to FIGURE 1, upper portion 12 of the housing includes a front panel 64 having a plurality of horizontal rows of selector buttons or keys 66 corresponding in number to the number of pipettes 56 and a plurality of vertical rows of buttons or keys corresponding to the number of recesses 34 in tray 30. Thus, assuming that the illustrated embodiment is capable of subjecting fifty specimens to nine different tests, the panel 64 would comprise nine horizontal rows and fifty vertical rows of selector buttons 66.

The electrical system to provide automatic operation of the sampling apparatus will now be described with particular reference to FIGURE 5. In the interest of simplicity only that portion of the circuit needed for the control of one pipette motor M and the table motors $M_1$ and $M_2$ is shown, it being understood that like additional circuits are provided to control the additional pipette motors.

Devices 102 and 103 are constant voltage sources common to all stations and may be typical 12 volt D.C. batteries. Line 104 connects battery 102 through a normally closed microswitch 106, which is periodically opened by the sequencer 29, to transistor 110 to supply collector bias to the transistor. Line 112 connects the base of transistor 110 through normally open microswitch 113 and normally open station switch 114 to battery 103 to supply a base bias to the transistor when the switches 113 and 114 are closed. Switch 113 is closed by block 59 when the pipette reaches the station with which the switch is associated and switch 14 is manually closed when the appropriate station button 66 is depressed. Additional switches 113a, etc., and 114a, etc., are provided at the other stations and are connected in parallel with the switches 113 and 114.

Relay 116, the coil of which is in series with transistor 110, is effective, when energized, to open normally closed switch contacts 118 in the external power supply line to reversible pipette motor M having forward and reverse windings F and R, respectively. Also in series with the forward and reverse windings are limit switches 120 and 122, respectively, the switch 120 being opened when the pipette reaches the limit of its forward travel and the switch 122 being opened when the pipette reaches the limit of its reverse travel, that is, when the pipette is in the rest position.

The operation of the device will now be described assuming that the mechanism is in the at rest position as shown in FIGURE 1, i.e., when all of the pipettes in their home position and with the table raised in its forward position to dispose the projecting lower ends of the pipettes in the wash trough 36. The specimen containers 35 are placed in recesses 34 and the desired sampling program is established by depressing the appropriate selector buttons 66 to close the appropriate ones of switches 114, 114a, etc.

A main start switch 126 is closed which actuates the forward windings of the pipette motors through closed relay contacts 118, closed limit switch 124, and closed contacts 128 of a manual reset switch 132. The manual switch 132 also includes contacts 134 which are open at all times except when the manual reset switch 132 is actuated as explained below. The pipettes will continue to travel until they reach a station in which the switch 114, 114a, etc., has been closed. When a pipette reaches this location, block 59 closes microswitch 113 and base bias is supplied to the transistor 110 causing the transistor to conduct thus energizing the relay coil 116 and opening contacts 118, deenergizing the pipette motor thus causing the pipette to stop at the preselected station. In the event that none of the switches 114 has been closed the pipette will continue to travel to a hold position at the last station at which the block 59 will open the limit switch 124. Thus, after predetermined time interval all of the pipettes will come to rest.

The closing of the main start switch 126 also energizes the motor of the sequencer 29. The sequencer, which is of conventional construction in all respects, is provided with control cams for actuating switches in the circuits of the table motors $M_1$ and $M_2$. The configuration of the cams is such that the operation of the motors $M_1$ and $M_2$ is delayed until each of the pipettes has reached its preselected position or has moved entirely across the unit to its final hold position.

When the pipettes have stopped their traversing movement and are located either at a sampling station or at a hold position the sequencing control then actuates motors $M_1$ and $M_2$ sequentially to move tray inwardly, then raise table 20 and tray 30 supported thereon into a sampling position in which the pipette extensions 58 are inserted into the specimens. The samples are withdrawn and delivered to the associated analyzing equipment. The sequencer 29 then lowers table 20, moves tray 30 outwardly to align trough 36 with the pipettes, moves table 20 upwardly to permit the pipettes to withdraw washing fluid from the trough and lowers the table again and then deenergizes the motors $M_1$ and $M_2$. The sequencer 29, through an additional cam, momentarily opens switches 106 to deenergize the relays 116 to permit the contacts 118 to close and reenergize the pipette motors to drive the pipettes to their next programmed sampling station, that is, a station at which the switch 114, 114a, etc., has been closed. The sequencer then repeats the operation of the table motors and the process is repeated until the sampling program is completed.

When all of the pipettes have moved to their final hold position all of the pipette motors M are deenergized by virtue of the opening of the limit switches 124. The sequencer 29 may then be stopped by operation by opening the manual start switch 126. Alternately, additional switches may be provided to be actuated by movement of all of the pipettes to their final position to generate a signal which automatically deenergizes the sequencer 29.

The reverse switch 132 may then be operated to energize the reverse winding of the pipette motors to guide the pipettes back to their rest position. The switch 132 has an additional set of contacts 136 to open the circuit to the sequencer during the reverse movement of the pipettes. When they reach the rest position the limit switches 125 will be opened. All elements are then placed in their original start condition and a new program may be initiated.

It is evident that this invention has unusual versatility. For example, if it is desirable to perform all nine tests or analyses on a single specimen, it is necessary only to depress all the buttons in the corresponding vertical row. This will move all nine pipettes to the same location in alignment with the single specimen as shown in FIGURES 2 and 4. Or it may be desired to perform simultaneously different tests on different specimens. Again, one need only to depress the appropriate button to move the particular pipettes to the corresponding specimens and simultaneously withdraw a sample from each of the specimens.

It is understood that the actual number of selector means 66 and recesses 34 provided in the apparatus is a variable depending upon the conditions and use to be satisfied.

The invention may be embodied in other specific forms without departing from the spirit or essential characteristics thereof.

What is claimed and desired to be secured by Letters Patent is:

1. Apparatus for sampling fluid specimens comprising:
   (a) means for supporting a plurality of specimen containers in a row;
   (b) a plurality of sampling devices independently movably mounted above said support means;
   (c) means for moving said devices independently along said row to dispose one or more of said devices above a preselected container; and
   (d) means for moving said support means to dispose said containers in sampling position with one or more sampling devices within said preselected container to permit sampling of the specimen therein.

2. Apparatus according to claim 1 wherein said support means comprises a vertically movable base member, tray means mounted on said base member for movement transversely of said row and wherein said positioning means includes mechanism for moving said tray means on said base member and for moving said base member in a vertical plane to place said tray means in sampling position.

3. Apparatus according to claim 2 wherein said tray means comprises a front portion having a plurality of recesses into which specimen containers are placed and a rear portion having trough means for holding a washing fluid.

4. Apparatus according to claim 1 wherein said moving means comprises drive means associated with each said device to move each one independently of the others, and control means adapted to deenergize said drive means to stop each said device at a preselected position with respect to said support means.

5. Apparatus according to claim 4 wherein said control means comprises a plurality of selector means connected to said control means to determine the preselected position at which each said device is to be stopped.

6. Apparatus according to claim 1 wherein said support means comprises a tray member having a plurality of recesses therein; said moving means comprises drive means associated with each said device to move each one independently of the others, and control means adapted to deenergize said drive means to stop each said device above a preselected recess; and said positioning means includes means for determining the preselected recess at which each said device is to be stopped.

7. Apparatus according to claim 6 including means for mounting said devices in a manner to enable simultaneous insertion of said devices into the same container.

References Cited

UNITED STATES PATENTS

| 3,143,393 | 8/1964 | Seguin Des Hons | 23—253 |
| 3,188,181 | 6/1965 | Peterson et al. | 23—253 |
| 3,239,312 | 4/1966 | Bell et al. | |
| 3,269,800 | 8/1966 | Lukrec | 23—253 X |
| 3,327,535 | 6/1967 | Sequeira | 73—423 |

S. CLEMENT SWISHER, *Primary Examiner.*